March 15, 1960 R. M. HELLER 2,928,500
PROTECTIVE CAP STRUCTURE
Filed May 26, 1958
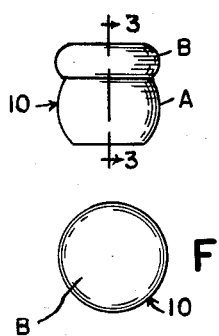
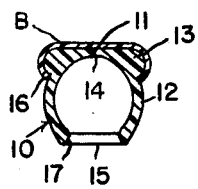
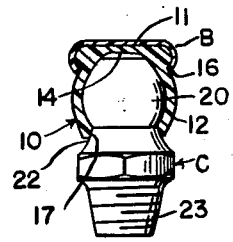
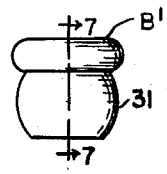
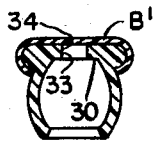
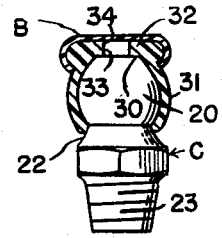
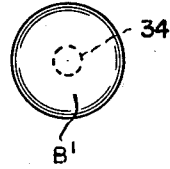
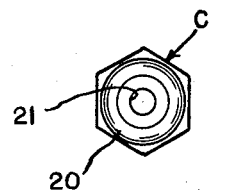
INVENTOR.
ROBERT M. HELLER
BY
ATTORNEYS

United States Patent Office 2,928,500
Patented Mar. 15, 1960

2,928,500
PROTECTIVE CAP STRUCTURE

Robert M. Heller, Birmingham, Mich., assignor to Watts Electric & Mfg. Co., Birmingham, Mich., a corporation of Michigan Application May 26, 1958, Serial No. 737,779

1 Claim. (Cl. 184—88)

This invention relates generally to protective cap structures for grease fittings and the like, and refers more particularly to caps made from plastic material and capable of preventing foreign matter such as dust, dirt, grit and moisture from entering the grease passages of such fittings.

One of the essential objects of the invention is to provide a composite cap made from two plastic materials respectively of high and low hardness and preferably of different colors to provide a two tone effect.

Another object is to provide a composite cap wherein the body portion thereof is preferably made from a vinyl plastisol of low hardness, so that such body portion will be sufficiently soft and flexible to be readily applied to and removed from a grease fitting and the like.

Another object is to provide a composite cap wherein the knob or finger piece thereof is preferably made from a vinyl plastisol of high hardness, so that it will resist compression or distortion and will afford a firm grip for the fingers when the cap is applied to and removed from a fitting.

Another object is to provide a composite cap wherein the knob or finger piece of high hardness envelops the closed end of said cap and serves to reinforce and protect said closed end, especially when said closed end is on the underside of a grease fitting of a motor vehicle during travel thereof over rough roads.

Another object is to provide a composite cap that is simple in construction, economical to manufacture, and efficient in use.

Other objects, advantages and novel details of construction of this invention will be made more apparent as this description proceeds, especially when considered in connection with the accompanying drawing wherein:

Figure 1 is an elevational view of a cap embodying my invention.

Figure 2 is a top plan view of the cap illustrated in Figure 1.

Figure 3 is a vertical sectional view taken substantially on the line 3—3 of Figure 1.

Figure 4 is an elevational view of the grease fitting, and showing in section a cap embodying my invention applied thereto.

Figure 5 is an elevational view of a slightly modified form of cap.

Figure 6 is a top plan view of the cap illustrated in Figure 5.

Figure 7 is a vertical sectional view taken substantially on the line 7—7 of Figure 5.

Figure 8 is an elevational view of a grease fitting, and showing in section the modified form of cap applied thereto.

Figure 9 is a top plan view of the grease fitting.

In the drawing, A is the body portion, and B is the knob or finger piece of a cap 10 embodying my invention.

As shown, the body portion A is formed from a relatively soft durable plastic material such as a vinyl plastisol of low hardness, and comprises a substantially flat annular base 11, and a hollow substantially globular socket 12 integral with and projecting endwise from one side of said base 11.

Preferably the base 11 projects laterally beyond the sides of the socket 12 and has at its periphery a circumferentially extending bead 13 of greater thickness than the remainder of the base. Such bead 13 merges with and reinforces the adjacent sides of the globular socket 12.

The socket 12 is closed at one end and open at the other and has relatively thin walls of substantially uniform thickness.

The closed end 14 of the socket is located back to back with the base 11, while the open end 15 of the socket is concentric with the axis of the base 11. Thus this socket 12 of the body portion A is sufficiently soft and flexible to be readily applied to and removed from a grease fitting and the like.

The knob or finger piece B is formed from a relatively hard durable plastic material such as a vinyl plastisol of high hardness, and envelops the base 11 including the peripheral bead 13 thereof. Preferably the inner surface of this knob or finger piece B is united firmly and permanently in surface-to-surface relation to the outer surface of the base 11, including the bead 13 thereof. The edge 16 of said knob or finger piece B extends circumferentially of and abuts or bears against the outer surface of the socket 12. Thus this knob or finger piece B will reinforce and protect the closed end 14 of the socket and will resist compression or distortion. Such knob or finger piece B will also afford a firm grip for the fingers when the cap is applied to and removed from a grease fitting.

In addition to forming the cap from two plastic materials of different hardness, such plastic materials are also of different colors to provide a two tone effect. Preferably the body portion A is formed from a red plastic material, while the knob or finger piece B is formed from a dark blue or black plastic material. Such contrasting colors clearly distinguish the socket 12 from the knob or finger piece B, and enhances the over-all appearance of the cap.

In use, the socket 12 is sleeved upon the globular free end portion 20 of a grease fitting C, so that the closed end 14 of the socket, the base 11, and the knob or finger piece B will be disposed over and will effectively prevent any foreign matter such as dust, dirt, grit and moisture from entering the grease passage 21 of such fitting. Preferably the inside dimensions of the socket 12 of the cap are approximately the same as the outside dimensions of the globular free end portion 20 of the fitting, so that the relatively soft flexible walls of the socket 12 will envelop and will fit tightly upon the globular free end portion 20. In fact, the free edge 17 of the socket portion 12 of the cap will abut or bear against the neck 22 of the fitting in rear of said globular free end portion 20, and thus will preclude any foreign matter from working around the globular free end portion 20 to the grease passage 21.

As usual, the exteriorly threaded shank 23 of the grease fitting is adapted to engage the usual interiorly threaded socket (not shown) therefor in any device or apparatus to be lubricated. The knob or finger piece B of the cap may be utilized to apply the socket 12 of the cap to and to remove such socket from the fitting C.

In the present instance, the cap 10 is formed on a mandrel (not shown) devoid of moving parts, and since mandrels of different constructions may be employed, the resulting caps may likewise be different in construction. For example, in Figures 5 to 8 inclusive, I have illustrated a slightly modified form of cap wherein the closed end 30 of the socket 31 and the base 32 are provided with registering holes or apertures 33 and 34 respectively that are made by an axially extending spring pressed pin of a mandrel (not shown). The knob or finger piece B' of this cap closes and conceals such registering openings 33 and 34. Other than this, the cap illustrated in Figures 5 to 8 inclusive is similar in construction to the cap 10 illustrated in Figures 1 to 4 inclusive.

What I claim as my invention is:

A protective composite cap structure for a grease fitting and the like, comprising a body portion, and a finger piece, said body portion being formed of plastic material of low hardness and having an annular base and a flexible hollow substantially globular socket integral with and projecting from one side of said base, said socket having an open end opposite said base and adapted to be sleeved upon a part of said fitting, said base projecting laterally beyond the sides of said socket and having at its periphery a circumferentially extending bead of greater thickness than the remainder of said base and merging with and reinforcing the adjacent sides of said globular socket, the walls of said socket being flexible and substantially uniform in thickness, said finger piece being formed of plastic material of high hardness as compared to said body portion and enveloping and united permanently in surface-to-surface relation with said base, the marginal portion of said finger piece being return bent to extend over and grip said bead with a mechanical lock, the edge of said finger piece bearing against and further reinforcing the adjacent sides of said socket whereby said finger piece will resist compression and distortion and will afford a firm grip for the fingers when the cap is applied to and removed from a fitting.

References Cited in the file of this patent

UNITED STATES PATENTS

| | | |
|---|---|---|
| 1,379,609 | Barry | May 31, 1921 |
| 1,730,202 | Geyer | Oct. 1, 1929 |
| 2,530,888 | Marchelewicz | Nov. 21, 1950 |
| 2,599,472 | Miller | June 3, 1952 |
| 2,680,497 | Miller | June 8, 1954 |

FOREIGN PATENTS

| | | |
|---|---|---|
| 1,119,717 | France | Apr. 9, 1956 |
| 89,017 | Norway | Apr. 1, 1957 |